(12) United States Patent
Gagnon et al.

(10) Patent No.: US 12,672,722 B2
(45) Date of Patent: Jul. 7, 2026

(54) MOTION SIMULATOR CHAIR

(71) Applicant: D-BOX TECHNOLOGIES INC.,
Longueuil (CA)

(72) Inventors: Stephan Gagnon, Laval (CA); Robert Desautels, Longueuil (CA); Jean-François Menard, Longueuil (CA)

(73) Assignee: D-BOX TECHNOLOGIES INC.,
Longueuil (CA)

( * ) Notice: Subject to any disclaimer, the term of this patent is extended or adjusted under 35 U.S.C. 154(b) by 316 days.

(21) Appl. No.: 18/251,813

(22) PCT Filed: Jan. 10, 2022

(86) PCT No.: PCT/CA2022/050026
§ 371 (c)(1),
(2) Date: May 4, 2023

(87) PCT Pub. No.: WO2022/147630
PCT Pub. Date: Jul. 14, 2022

(65) Prior Publication Data
US 2024/0016297 A1 Jan. 18, 2024

Related U.S. Application Data

(60) Provisional application No. 63/135,185, filed on Jan. 8, 2021.

(51) Int. Cl.
*A63F 13/90* (2014.01)
*A47C 1/00* (2006.01)
(Continued)

(52) U.S. Cl.
CPC .............. *A47C 7/563* (2013.01); *A47C 7/004* (2013.01); *A47C 7/006* (2013.01); *A63F 13/50* (2014.09); *A63F 13/90* (2014.09); *A47C 1/00* (2013.01)

(58) Field of Classification Search
CPC .......... A63F 13/28; A63F 13/90; A63F 13/50; A47C 1/00; A47C 7/563; A47C 7/004; A47C 7/006
See application file for complete search history.

(56) References Cited

U.S. PATENT DOCUMENTS 6,032,976 A * 3/2000 Dickie ................. A61G 5/1075
180/65.6
7,234,772 B2 6/2007 Wells
(Continued)

FOREIGN PATENT DOCUMENTS

EP 1090568 B1 3/2006
GB 2383783 7/2003
(Continued)

*Primary Examiner* — Robert E Mosser
(74) *Attorney, Agent, or Firm* — NORTON ROSE FULBRIGHT CANADA LLP

(57) ABSTRACT

A motion simulator chair has a base and a seat. An actuator assembly is between the base and the seat, the actuator assembly including a frame connected to the base, a carrier connected to the seat. A linear actuator is operatively connected to the frame and to the carrier by a mechanism, the linear actuator operable to cause a movement of the carrier relative to the frame, the movement being at least partially vertical. A direction of movement of the linear actuator lies in a transverse plane that is between 15 degrees and 165 degrees from a vertical frontal plane of the motion simulator chair.

20 Claims, 13 Drawing Sheets

(51) Int. Cl.
    *A47C 7/00*         (2006.01)
    *A47C 7/56*         (2006.01)
    *A63F 13/50*       (2014.01)

(56)           References Cited

U.S. PATENT DOCUMENTS

| 2004/0189073 | A1* | 9/2004 | Chadwick | .......... A47C 1/03255 |
| | | | | 297/383 |
| 2020/0242959 | A1 | 7/2020 | Gonzalez | |
| 2023/0337827 | A1* | 10/2023 | Pinkelman | ............. A47C 7/462 |

FOREIGN PATENT DOCUMENTS

| KR | 20180062772 | 6/2018 |
| WO | 2011064560 | 6/2011 |

* cited by examiner 22, 123, 223, 323, 323a, 323b, 327

MOTION SIMULATOR CHAIR

CROSS-REFERENCE TO RELATED APPLICATION

The present application claims the priority of U.S. Patent Application No. 63/135,185, filed on Jan. 8, 2021, and incorporated herein by reference.

TECHNICAL FIELD

The present disclosure relates to actuators used in motion simulators for the entertainment and gaming industries.

BACKGROUND OF THE ART

In the video and televised entertainment industry, and in gaming, there is an increasing demand for enhancing the experience of a user. Motion simulation may be able to produce movements in synchrony with sequences of images of a viewing. However, actuators for motion simulators may be limited to some types of seats, or may be limited to some floor configurations. Accordingly, some seats commonly in domestic or industrial type settings may not be suited for motion simulation, as actuators for such seats may be voluminous, may have a large footprint, etc. It would be desirable to devise actuators adapted for use with different types of seats.

SUMMARY

In an aspect, there is provided a motion simulator for a chair, comprising: a frame connectable to a base of the chair supported on a ground; a carrier connectable to a seat of the chair and operatively connected to the frame; and an actuator operatively connected to the frame and to the carrier, the actuator operatively connected to a controller, actuation of the actuator causes the frame to move relative to the carrier to increase a height and/or tilt the seat of the chair relative to the ground in response to an input from the controller.

In another aspect, there is provided a motion simulator chair, comprising: a base; at least a seat; and an actuator assembly between the base and the seat, the actuator assembly including a frame connected to the base, a carrier connected to the seat, a linear actuator operatively connected to the frame and to the carrier by a mechanism, the linear actuator operable to cause a movement of the carrier relative to the frame, the movement being at least partially vertical, wherein a direction of movement of the linear actuator lies in a transverse plane that is between 15 degrees and 165 degrees from a vertical frontal plane of the motion simulator chair.

Further in accordance with the aspects, for example, the transverse plane is between 65 degrees and 115 degrees from the vertical frontal plane of the motion simulator chair at an at-rest condition of the seat.

Still further in accordance with the aspects, for example, the transverse plane moves by at most 30 degrees relative to the vertical frontal plane during use.

Still further in accordance with the aspects, for example, the frame is connected to the base by a post.

Still further in accordance with the aspects, for example, the carrier is connected to the seat by a post.

Still further in accordance with the aspects, for example, a projection of the post of the seat intersects the post of the base.

Still further in accordance with the aspects, for example, the post of the seat includes a height-adjustment cylinder.

Still further in accordance with the aspects, for example, the base has legs with casters.

Still further in accordance with the aspects, for example, the frame has a U-shaped cross-section.

Still further in accordance with the aspects, for example, the linear actuator is at least partially within the frame.

Still further in accordance with the aspects, for example, the linear actuator is pivotally connected to the frame.

Still further in accordance with the aspects, for example, the frame has an inverted U-shaped cross-section.

Still further in accordance with the aspects, for example, the carrier is pivotally connected to the frame.

Still further in accordance with the aspects, for example, the mechanism includes a link member pivotally connected to the frame, and pushed or pulled by the linear actuator to impart a movement to the carrier.

Still further in accordance with the aspects, for example, the mechanism includes another link member pivotally connected to the linear actuator and to the link member.

Still further in accordance with the aspects, for example, the mechanism includes another link member pivotally connected to the carrier and to the link member.

Still further in accordance with the aspects, for example, the mechanism includes an adjustment lever assembly to adjust an at-rest orientation of the linear actuator.

Still further in accordance with the aspects, for example, the chair is a gaming chair.

Still further in accordance with the aspects, for example, a controller may be provided to drive the linear actuator.

Still further in accordance with the aspects, for example, the linear actuator is an electro-mechanical linear actuator.

Many further features and combinations thereof concerning the present improvements will appear to those skilled in the art following a reading of the instant disclosure.

DETAILED DESCRIPTION

Figure 1:
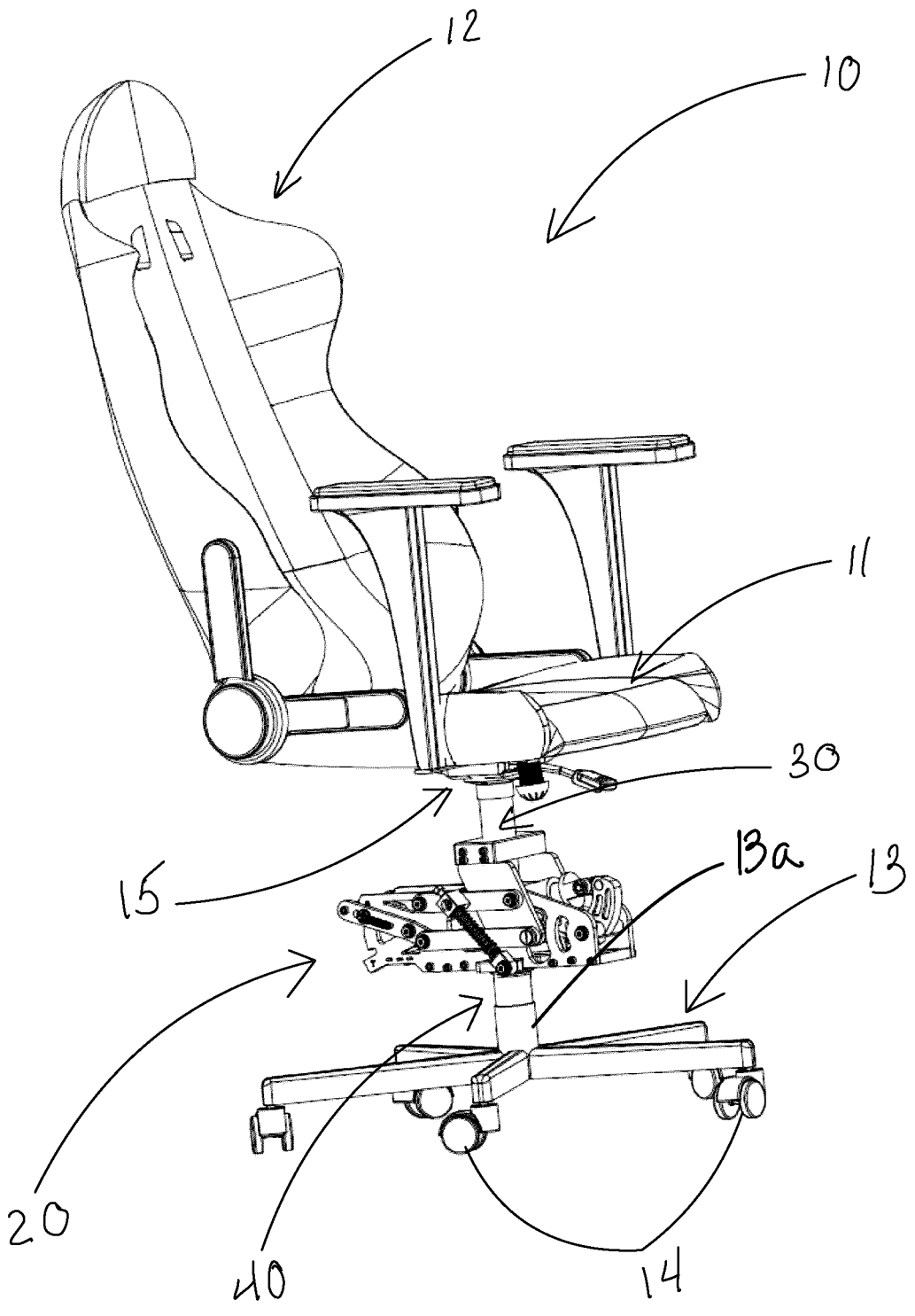
FIG. 1 is a three dimensional view of a chair equipped with a motion simulator in accordance with one embodiment.

Referring to FIG. 1, a motion simulator chair, referred simply as "chair" herein below is shown at 10. The chair 10 has a seat (or like effector) 11 and a back rest 12 generally transverse to the seat 11. The chair 10 includes a base 13 equipped with casters 14 for rolling the chair 10 relative to a ground. The base 13 may have legs projecting from a common center, with the variant of FIG. 1 showing five legs projecting radially and spread apart by 72 degrees, as one possible configuration among others. The base 13 could have more or fewer legs, or a single support, a foot ring, etc. The base 13 may have a central post or hub 13a, whether it has legs or a single support, or any other configuration.

Casters 14 are optional as the chair 10 could be seated on its base 13. The chair 10 is similar to an office chair including a height adjustment mechanism including a pneumatic piston (not shown). The pneumatic piston is traditionally mounted at its upper end to a mounting plate 15 of the chair 10 and to the base 13. The mounting plate 15 is used as an interface between the pneumatic piston and the seat 11 of the chair 10.

The chair 10 of the present embodiment is equipped with an actuator assembly 20 between the seat 11 of the chair 10 and the base 13 of the chair 10. The actuator assembly 20 is secured to the mounting plate 15 of the chair 10 via an upper interface 30 and is secured to the base 13 via a lower interface 40. The upper and lower interfaces 30, 40 may include cylindrical components sized to be received within bores or like components defined by the base 13 (e.g., in the central post 13A) and the mounting plate 15. These bores may have been originally sized to receive opposite ends of a pneumatic piston (also known as height-adjustment cylinder), whereby the actuator assembly 20 may be retrofitted in some existing chairs 20. The interfaces 30 and 40 may also be integral parts of the seat 11 and base 13, as an alternative. As shown in FIG. 1, the interface 30 may be a post and/or may include a height-adjustment cylinder (a.k.a., gas lift cylinder), as observed from the biased-handle used to adjust and hold a given seat height. In an embodiment, the interfaces 30 and 40 are aligned in a vertical direction. The vertical alignment may be embodied by a coincidence between central axes of the interfaces 30 and 40 (though the coincidence may only be occasional due to the movement imparted by the actuator assembly 40). The vertical alignment may be embodied by a downward projection of the interface 30 intersecting the interface 40, such as when in an at-rest condition of the chair 10.

Thus, the actuator assembly 20 and the upper and lower interfaces 30, 40 may be used to retrofit a regular office chair into a gaming chair with enhanced gaming experience as will be explained herein below, or a motion simulator chair used while watching a video or listening to an audio output. That is, the actuator assembly 20 may be operatively connected to a controller to control a height and/or a tilt angle of the seat 11 and back rest 12 of the chair 10 relative to a ground when a user is playing video games, or watching a video or listening to an audio output. The actuator assembly 20 may be used to enhance a user experience of a game. For instance, the chair may increase in height and/or tilt backward when the user is playing a car video game in which the car accelerates and increases in speed.

While reference is made herein to the use of the motion simulator chair 10 in the context of gaming, the motion simulator chair 10 is for inducing a desired sensory perception to its user, for example a perception of motion, by means of vibro-kinetic effects (e.g., vibration, movement, orientation). The effects may be devised so as to be interpreted by the user as kinesthetic cues. Moreover, such effects may be synergistically paired with one or more sensory feeds (such as audio and/or video feeds) delivered to the user for enhancement of the sensory perception. The sensory feeds may be on a computer screen, a television, a tablet, a VR headset, among other possible uses.

In implementations, the motion simulator chair 10 may be provided as seating for a living room, a movie theater, an auditorium or a stadium, among others. The motion simulator may also be provided for simulation applications, for example for inducing sensory perceptions relatable to those occurring upon operating heavy machinery such as cranes, and of various vehicles such as air, water, racetrack, all-terrain or road-borne vehicles. The seat 11 may indeed be a platform, a bench, a pod, a nacelle, a chassis, a cockpit, or even an entire vehicle as the case may be in order to realistically replicate a operating environment and/or conditions. Depending on the implementation, such motion simulator chairs 10 may be used in professional settings such as training facilities, or in recreational settings such as themed venues (gaming centers, amusement parks, museums or the like) or even in residential gaming systems.

Figure 2:
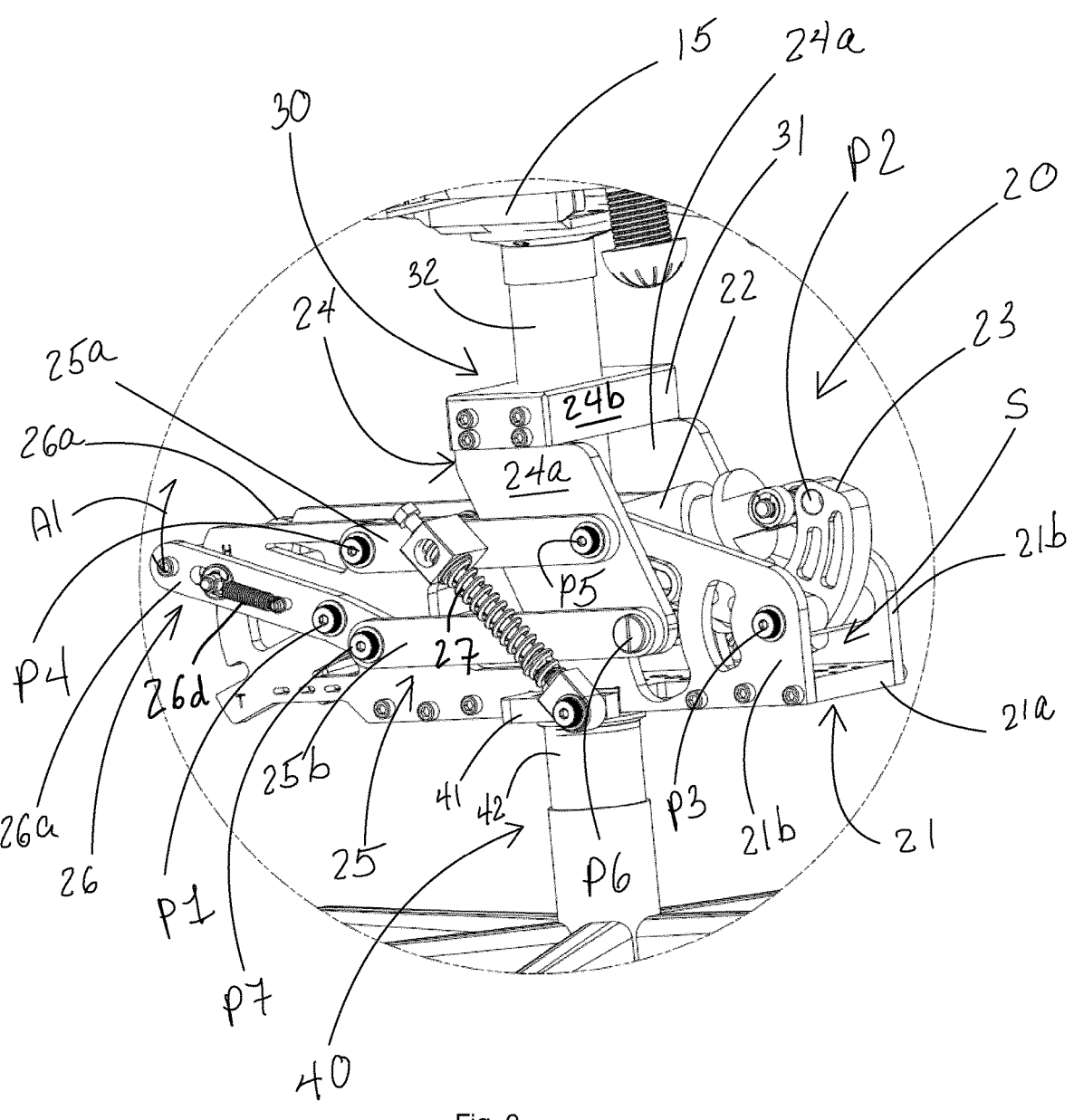
FIG. 2 is an enlarged view of a portion of FIG. 1 illustrating the motion simulator in greater detail.

Referring now to FIG. 2, the actuator assembly 20 and the upper and lower interfaces 40 are shown in greater detail.

The actuator assembly 20 includes a frame 21 secured to the base 13 of the chair 10 via the lower interface 40. The frame 21 includes a bottom wall 21a and two side walls 21b extending generally transversally from the bottom wall 21a. Accordingly, the frame 21 may be said to have a U-shaped cross-section. A spacing S is defined between the two side walls 21b. The actuator assembly 20 includes an actuator 22 located within the spacing S defined by the frame 21. Any suitable actuator may be used, for instance, a ball-screw actuator, a leadscrew actuator, or like electromechanical actuator converting electrical signals into a translational output. In such embodiments, an electric motor may have its shaft in line with an axis of rotation of the lead screw or ball screw. Examples of actuators may be as described in U.S. Pat. Nos. 9,664,267, 9,863,513, 10,012,295, incorporated herein by reference. Alternatively, the actuator 22 may be an hydraulic actuator, an electric actuator, a solenoid, a pneumatic actuator, and so on.

The actuator 22 is pivotally mounted to the two side walls 21b of the frame 21 at a first end of the actuator 22. A first pivot axis P1 is defined between the first end of the actuator 22 and the frame 21. A second end of the actuator 22 is pivotally mounted to a pivoting member 23 at a second pivot axis P2 (though shown detached in FIGS. 2 and 3 to illustrate their configurations). The pivoting member 23 is pivotally mounted to the two side walls 21b of the frame 21 at a third pivot axis P3 offset from the second pivot axis P2. The pivoting member 23 is, in the embodiment shown, L-shaped. However, other shapes, such as a triangular shape, are contemplated. As the pivot axes P1 and P2 are at opposed ends of the actuator 22, a distance between them may be varied, causing a pivoting movement of the pivoting member 23 about pivot axis P3.

The actuator assembly 20 includes a carrier 24 secured to the mounting plate 15 of the chair 10 via the first interface 30. The carrier 24 is connected to the frame 21 via linking members 25. In the embodiment shown, the carrier 24 includes two side plates 24a interconnected by an upper wall 24b, such that the carrier 24 may be said to have a U-shaped cross-section, though inverted. The first interface 30 may be at least partly integrally connected to the upper wall 24b. The two side plates 24a may be parallel to one another and located adjacent the side walls 21b of the frame 21. The two side plates 24a may be located outside the spacing S defined by the frame 21. As shown in FIG. 2, each of the two side plates 24a is connected to a respective one of the two side walls 21b of the frame 21 via top linking members 25a and a bottom linking members 25b. The linking members 25 may be bars, rods, tubing members, and so on. The top linking members 25a are pivotally connected to the side walls 21b of the frame 21 at fourth pivot axes P4 and to the two side plates 24a at fifth pivot axes P5. As shown in FIG. 2, the fourth and fifth pivot axes P4, P5 are located at opposite ends of the top linking members 25a. First ends of the bottom linking members 25b are pivotally connected to the two side plates 24a at sixth pivot axes P6.

The actuator assembly 20 includes an adjustment lever 26 that is used to select whether actuation of the actuator 22 varies a height of the seat 11 of the chair 10 or an angle of the seat 11 of the chair 10 relative to the ground. In the depicted embodiment, the adjustment lever 26 includes two adjustment arms 26a disposed on opposite sides of the frame 21. Each of the two adjustment arms 26a is pivotally connected between its opposite ends to a respective one of the side walls 21a of the frame 21 at the first pivot axes P1. First ends of the two adjustment arms 26a are movable along direction denoted by arrow A1. Second ends of the two adjustment arms 26a are pivotally connected at seventh connection points P7 to second ends of the lower linking members 25b. Therefore, movements of the first ends of the two adjustment arms 26a toward the ground moves the second ends of the lower linking members 25b toward the seat 11 of the chair 10. Distances between the ends of the two adjustment arms 26a and the first pivot axis P1 may be uneven to create a lever effect to facility movements of the adjustment arms 26a between a height-adjustment position shown in FIG. 2 and a tilt-adjustment position denoted by "T" in FIG. 2.

Figure 3:
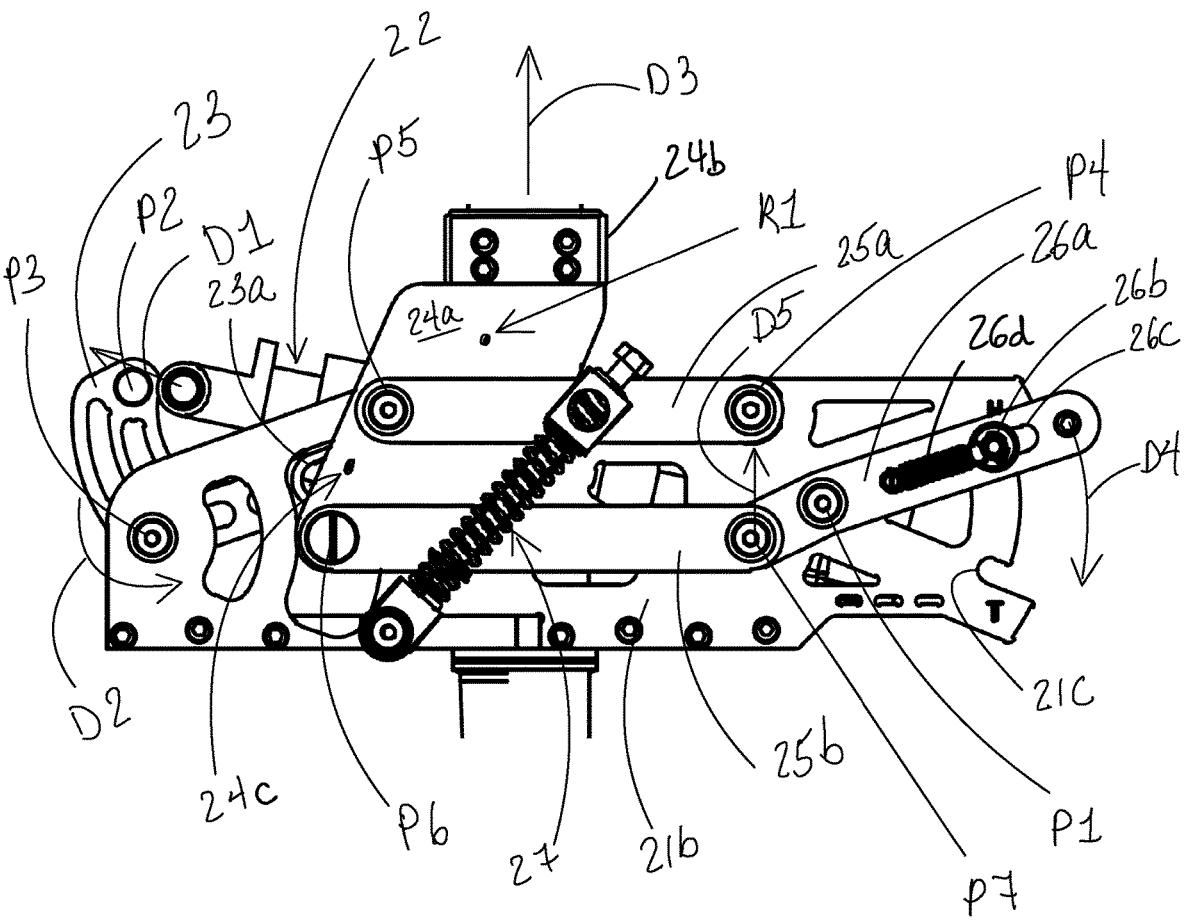
FIG. 3 is a side view of the motion simulator of FIG. 2.

Referring now to FIG. 3, the pivoting member 23 is further operatively connected to the two side plates 24a of the carrier 24 via a shaft 24c that extends from one of the two side plates 24a of the carrier 24 to the other. The shaft 24c is slidably received within a slot 23a defined by the pivoting member 23. Hence, elongation of the actuator 22 along direction D1 pushes on the second pivot axis P2 at which the pivoting member 23 is pivotally connected to the actuator 22. This movement causes the pivoting member 23 to pivot in a counter clockwise direction (in FIG. 3) about direction D2 about the third pivot axis P3 thereby moving the shaft 24c and the carrier 24 vertically away from the ground along direction D3. In so doing, the shaft 24c slides or moves within the slot 23a of the pivoting member 23. Contraction of the actuator 22 causes the pivoting member 23 to pivot in a clockwise direction about the third pivot axis P3 thereby moving the shaft 24c and the carrier 24, toward the ground. This assembly of components is one possible mechanism configuration to convert a generally horizontal movement, i.e., expansion or contraction of the actuator 22, into a generally vertical output, i.e., movement along D3 of the carrier 24. Other arrangements are possible, such as mechanisms without the adjustment lever 26.

Because the upper and lower linking members 25a, 25b are substantially parallel to one another when the adjustment lever 26 is in its height-adjustment position, rotation of the pivoting member 23 results in a height variation of the carrier 24, and of the seat 11 and back rest 12 of the chair 10 with limited variation of the angle defined between the seat 11 and the ground. However, if the adjustment lever 26 were pivoted downwardly along direction D4, the second ends of the lower linking members 25b would be moved upwardly along direction D5 thereby bringing the lower linking members 25b further away from parallel to the upper linking members 25a. In such a case, actuation of the actuator 22 would still result in a vertical motion of the shaft 24c of the carrier 24, but, as the shaft 24c moves away or toward the ground, the carrier 24 would have to rotate about an axis R1 to accommodate this movement because a distance between the fifth and sixth pivot axes P5, P6 and a distance between the fifth and fourth pivot axes P5, P4 are fixed. Hence, in tilt-adjustment, there may be more effect felt in a front to rear movement.

In the embodiment shown, the adjustment lever 26 includes a locking bar 26b, which also acts as a handle for a user, that may extend from one of the adjustment arms 26a to the other (though pair of pins could be used instead). The locking bar 26b is sized to be received within recesses 21c defined by the side walls 21b of the frame 21. Movements of the adjustment arms 26a are therefore blocked by the locking bar 26b received within the recesses 21c. To move the adjustment lever 26 away from the height-adjustment position shown in FIG. 3, a user may pull the locking bar 26b out of the recesses 21c by sliding the locking bar 26b within slots 26c defined by the adjustment arms 26. The user then moves the adjustment arms 26a along direction D4 until the locking bar 26b is in register with the other recesses 21c to lock the adjustment lever 26 in its tilt-adjustment position. The opposite can be done to move the adjustment lever 26 back to its height-adjustment position. A biasing member (s) 26d, such as a spring, may be used to bias the locking bar 26b within the recesses 21c. Other biasing members may be used, but they may be optional. As mentioned above, the adjustment mechanism featuring the lower linking members 25b and adjustment lever 26 may be optional.

Still referring to FIG. 3, biasing members 27 may be used to assist the actuator 22 in increasing a height of the chair 10 along D3 for example. The biasing members 27 may include two springs disposed on opposite sides of the frame 21, each spring mounted onto a rod or shaft and exerting a force between two blocks at the pivot ends. Each of the biasing members 27 is pivotally connected to the frame 21 at a first end and to a respective one of the upper linking members 25a at its second end. However, it will be appreciated that other locations of the biasing member 27 are contemplated. For instance, the biasing members 27 may be located into the spacing S between the frame 21 and the upper interface 30. Any other suitable locations in which the biasing member 27 is able to bias the carrier 24 away from the ground is contemplated. One or more than two biasing members 27 may be used. The biasing member 27 may be a spring. The biasing member 27 may be a pneumatic device or any other suitable biasing member. A screw may be used to adjust a compression in the biasing member 27 to vary a force exerted by the biasing member 27. This may allow the actuator assembly 20 to be tailored to people of different weights.

In an embodiment, the actuator assembly 20 has a symmetrical plane that is vertical and that pass through a center of the actuator 22. Structural components may thus be evenly present on opposed sides of the actuator assembly 20, to spread the load of the chair 10.

Referring back to FIG. 2, the upper interface 30 includes a base 31 (i.e., that may be the upper wall 24b) secured to the actuator assembly 20 and a cylindrical shaft 32 protruding from the base 31. The base 31 and the cylindrical shaft 32 may be of any other suitable shape, may be monolithic with one another, or may be secured to one another via any suitable means (e.g., fasteners). The cylindrical shaft 32 is received within a bore defined by the mounting plate 15. Similarly, the lower interface 40 includes a base 41 secured to the actuator assembly 20 and a cylindrical shaft 42 protruding from the base 41. The base 41 and the cylindrical shaft 42 may be of any other suitable shape, may be monolithic with one another, or may be secured to one another via any suitable means (e.g., fasteners, set screws). The cylindrical shaft 42 is received within a bore defined by the base 13. Cylindrical shapes are just an option, and components may be tubular.

Figure 4:
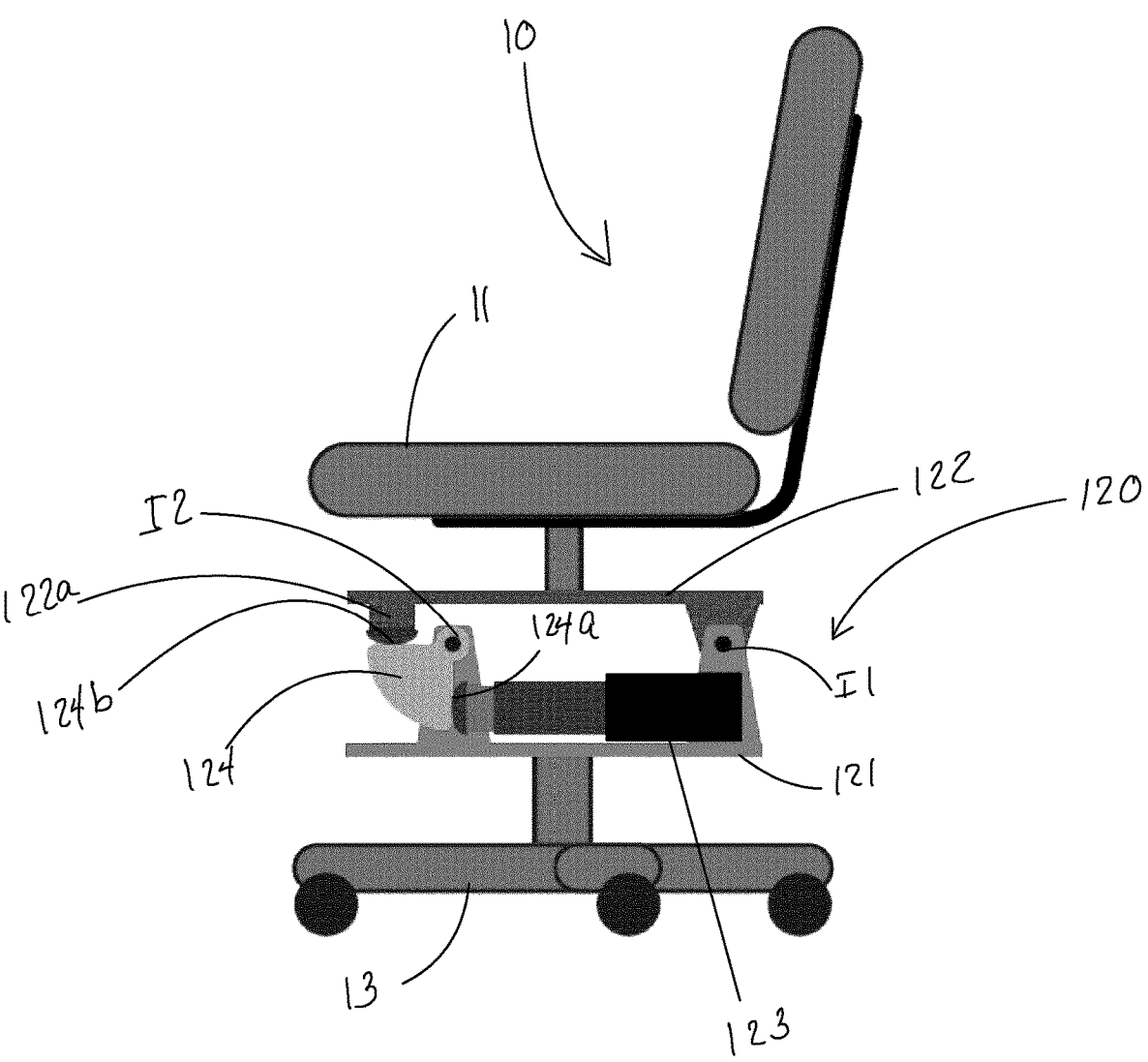
FIG. 4 is a schematic side view of a chair equipped with a motion simulator in accordance with another embodiment.

Referring now to FIG. 4, an alternate embodiment of an actuator assembly is shown at 120. The seat 11 of the chair 10 and the base 13 of the chair 10 are connected to one another via the actuator assembly 120. The embodiment of FIG. 4 is shown in schematic fashion, but may have many of the features of the actuator assembly 20 of FIGS. 2 and 3, such as the U-shaped cross-sections, the duplication of components and/or the symmetrical plane. Likewise, the actuator may be of the same nature.

In the embodiment shown, the actuator assembly 120 includes a frame 121 and a carrier 122 pivotally connected to the frame 121 at a first pivot axis 11. The frame 121 may have a U-shaped cross-section, at least at its pivot axes. An actuator 123 is secured to the frame 121. A cam 124 is pivotally mounted to the frame 121 at a second pivot axis 12 offset from the first pivot axis 11. The cam 124 has a first face 124*a* in abutment against an end of the actuator 123 and a second face 124*b* in abutment against a stopper 122*a* (or like abutment portion) defined by the carrier 122. The stopper 122*a* is spaced apart from the first pivot axis 11. The stopper 122*a* may be arcuate in geometry to facilitate its sliding engagement with the second face 124*b* of the cam 124.

Extension of the actuator 123 pushes on the cam 124 and rotates the cam 124 in a clockwise direction about the second pivot axis 12 thereby pushing the stopper 122*a* away from the base 13 of the chair 10. This results in the carrier 122 rotating about the first pivot axis 11 in a clockwise direction to tilt the seat 11 of the chair backward. Contraction of the actuator 123 allows the cam 124 to rotate in a counter clock-wise direction as a result of a gravity force exerted on the carrier 122 to rotate the carrier 122 about the first pivot axis 11 thereby pushing on the cam 124 to rotate the cam about the second pivot axis 12 in the counter cock-wise direction. Biasing device(s) may be present to assist in the upward movement.

Figure 5:
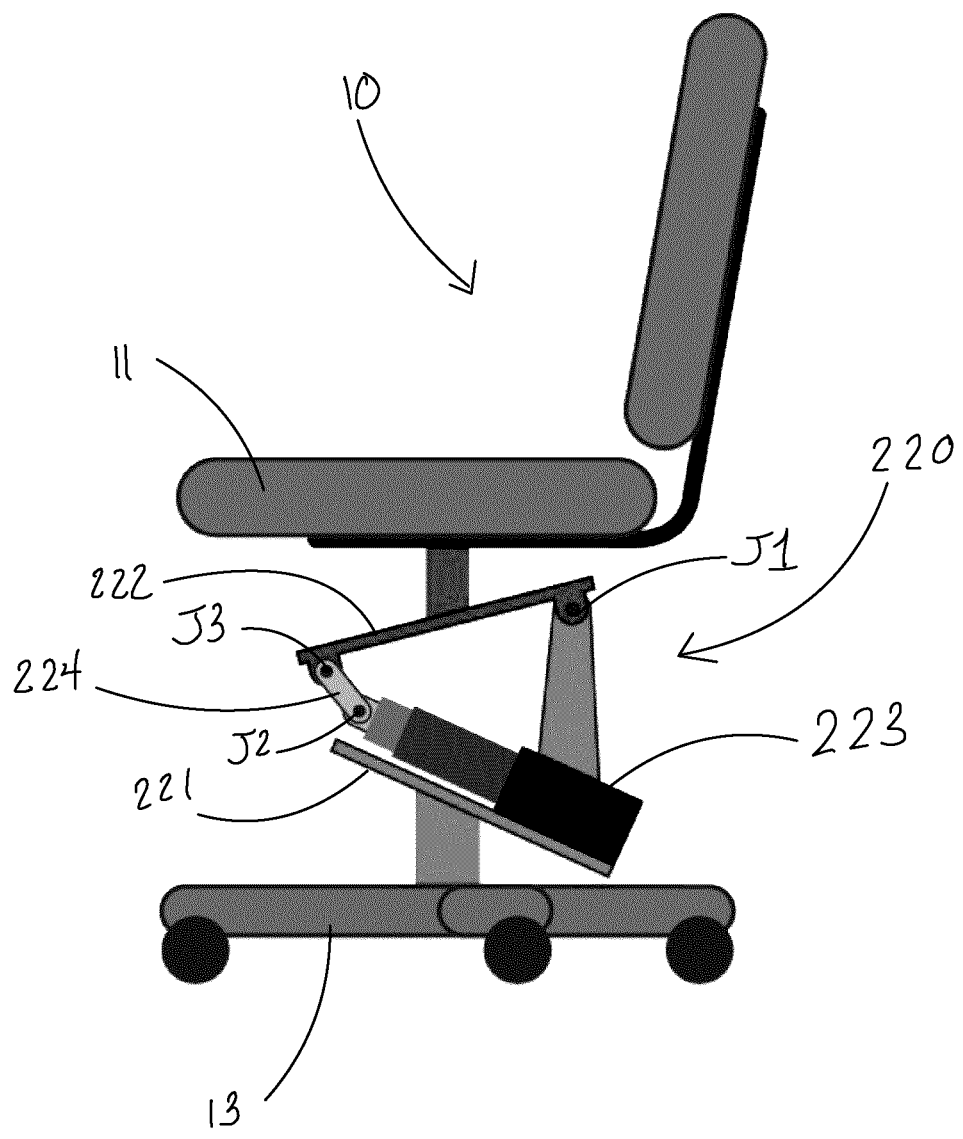
FIG. 5 is a schematic side view of a chair equipped with a motion simulator in accordance with another embodiment.

Referring to FIG. 5, an alternate embodiment of an actuator assembly is shown at 220. The seat 11 of the chair 10 and the base 13 of the chair 10 are connected to one another via the actuator assembly 220. The embodiment of FIG. 5 is shown in schematic fashion, but may have many of the features of the actuator assembly 20 of FIGS. 2 and 3, such as the U-shaped cross-sections, the duplication of components and/or the symmetrical plane. Likewise, the actuator may be of the same nature.

The actuator assembly 220 has a frame 221 and a carrier 222 pivotally connected to the frame 221 at a first pivot axis J1. An actuator 223 is fixedly secured to the frame 221. A distal end of the actuator 223 is pivotally connected to a first end of a linking member 224 at a second pivot axis J2. The linking member 224 is further pivotally connected at its second end to the carrier 222 at a third pivot axis J3. The base and carriers 221, 222 are non-parallel to one another.

An extension of the actuator 223 results in a push on the linking member 224 thereby pushing the pivot at the third pivot axis J3 upwardly to rotate the carrier 222 about the first pivot axis J1 in a clockwise direction to tilt the chair 10 backward. Contraction of the actuator 220 pulls on the linking member 224 to allow the third pivot axis J3 to move downwardly toward the ground and to pivot the carrier 222 about the first pivot axis J1 in a counter clockwise direction to tilt the chair 10 forward. Biasing device(s) may be present to assist in the upward movement.

Figure 6:
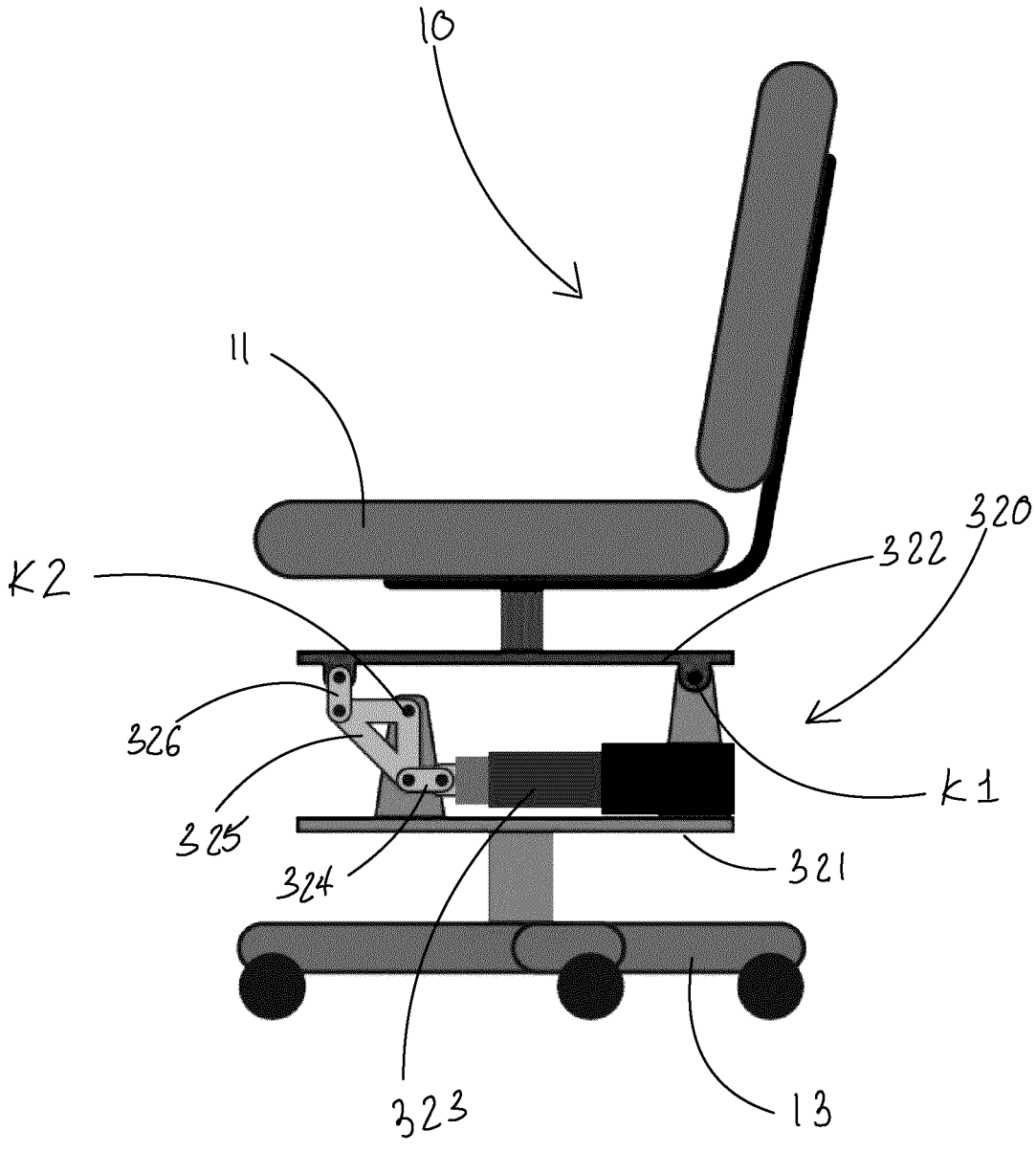
FIG. 6 is a schematic side view of a chair equipped with a motion simulator in accordance with another embodiment.

Referring now to FIG. 6, an alternate embodiment of an actuator assembly is shown at 320. The seat 11 of the chair 10 and the base 13 of the chair 10 are connected to one another via the actuator assembly 320. The embodiment of FIG. 6 is shown in schematic fashion, but may have many of the features of the actuator assembly 20 of FIGS. 2 and 3, such as the U-shaped cross-sections, the duplication of components and/or the symmetrical plane. Likewise, the actuator may be of the same nature. The embodiment of FIG. 6 may be similar in configuration to the linear actuator assembly described in PCT application no. PCT/CA2021/050814, incorporated herein by reference.

In the embodiment shown, the actuator assembly 320 includes a frame 321 and a carrier 322 pivotally connected to the frame 321 at a first pivot axis K1. Both the frame 321 and the carrier 322 may have U-shaped cross-sections at least at locations of the pivot axes K1 and K2, in similar fashion as for the actuator assembly 20 of FIGS. 2 and 3. An actuator 323 is secured to the frame 321 (e.g., in a gap as in FIGS. 2 and 3). An assembly of linking members interconnect an end of the actuator 323 to the carrier 322. The assembly of linking members includes a first member 324, an angled member 325 (also known a link member 325), and a second member 326. In terms of duplication of components, there may be pairs of the members 324 and 326, for a single angled member 325, or pair of all members, 324, 325, 326, etc. The members 324, 325 and 326 may be described as links.

The first member 324 is pivotally connected at its first end to the end of the actuator 323 and pivotally connected at its second end to the angled member 325. The angled member 325 is pivotally connected to the frame 321 for rotation about a second pivot axis K2. The angled member 325 is further pivotally connected to the second member 326 at a first end of the second member 326. The second end of the second member 326 is pivotally connected to the carrier 322.

Extension of the actuator 323 pushes on the first member 324 that pushes on the angled member 325 to rotate the angled member 325 about the second pivot axis K2. The first and angled members 324, 325 rotate relative to one another when the angled member 325 rotates about the second pivot axis K2. Rotation of the angled member 325 causes the angled member 325 to push against the second straight member 326 to push on the carrier 322 at a location distanced from the first pivot axis K1 resulting in the carrier 322, and the seat 11, rotating about the first pivot axis K1 and tilting backward. The motion is reversed when the actuator 323 is contracted.

Figure 6A:
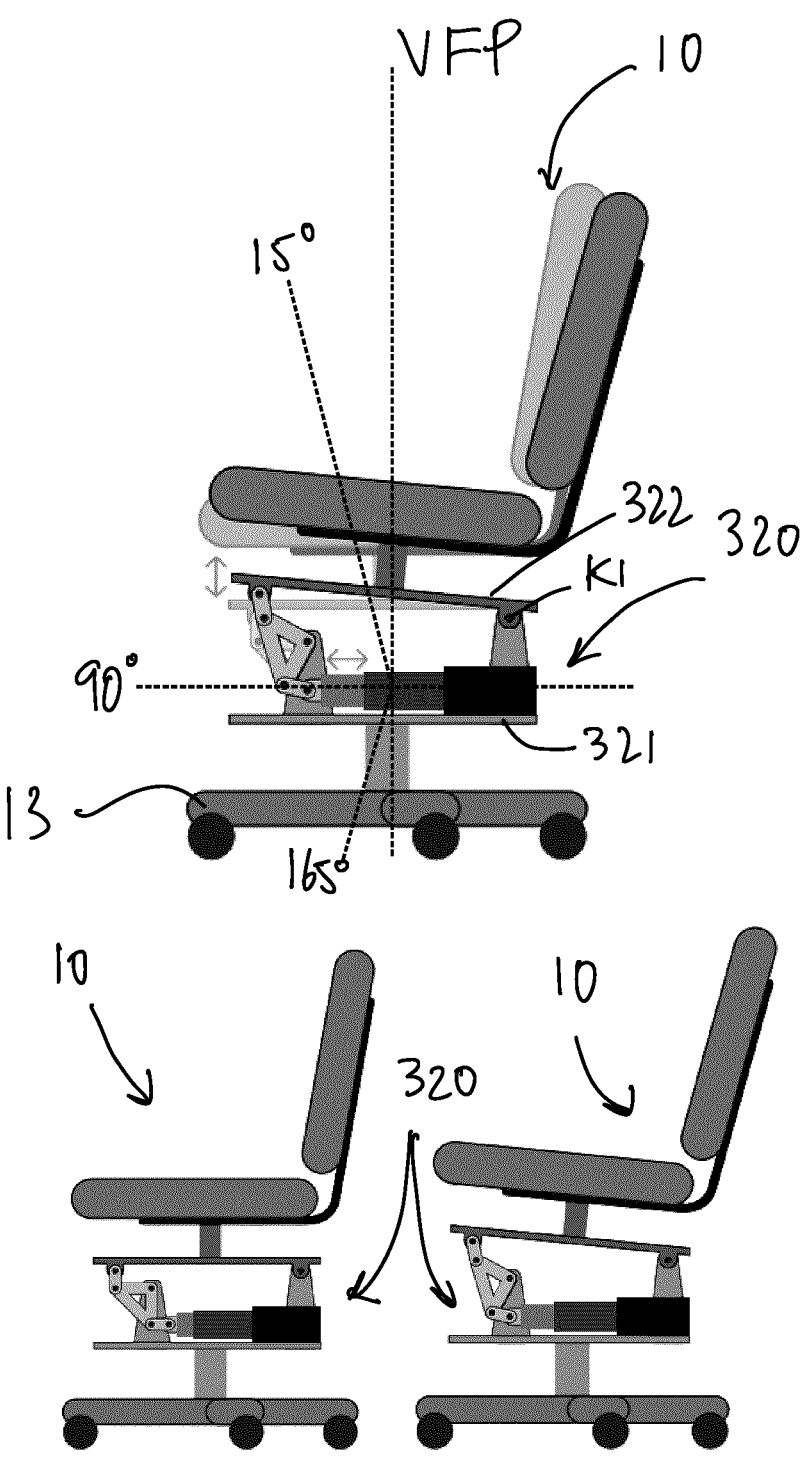

FIG. 6*a* shows an example of the range of movement of the chair 10 with the actuator assembly 320, between extreme positions. The actuator assembly 320 could also be flipped upside down, i.e., with the frame 321 on the side of the seat 11 and the carrier 322 on the side of the base 13.

Figure 6B:
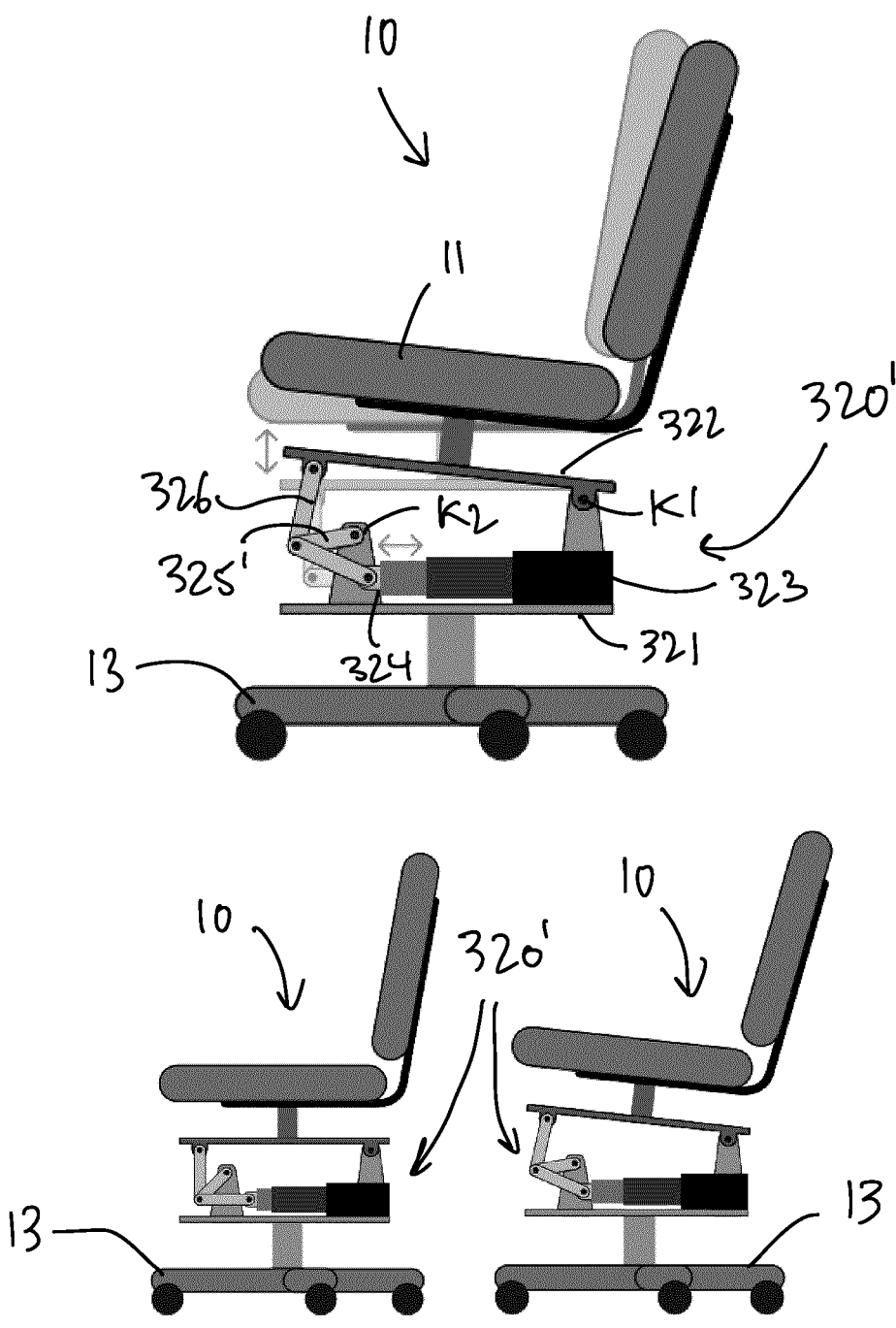

FIG. 6*b* depicts an arrangement similar to the one of FIGS. 6 and 6*a*, with an actuator assembly 320' having like components, with the exception of the link member 325' instead of the angled member 325. The behavior is similar, but there is one fewer pivot axis.

Figure 6C:
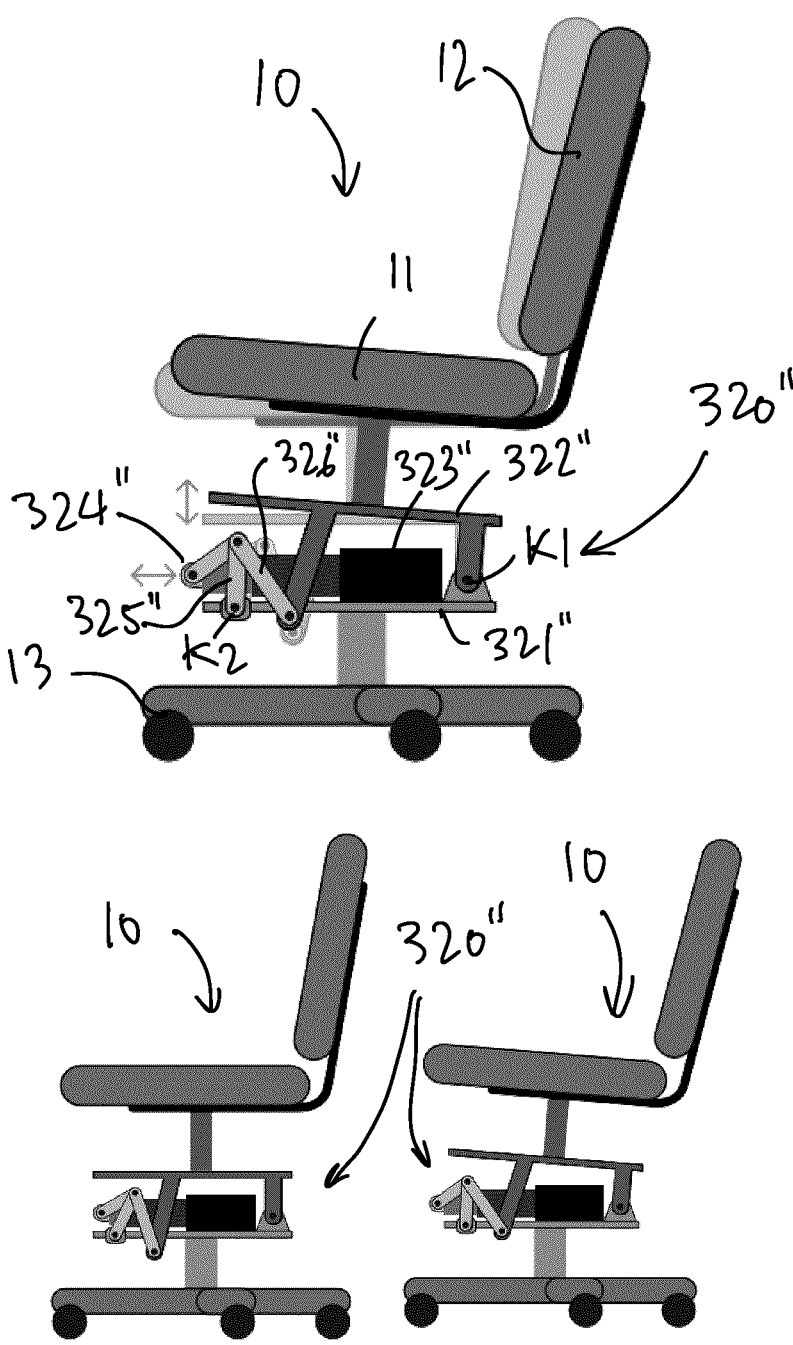

Referring now to FIG. 6*c*, an alternate embodiment of an actuator assembly is shown at 320". The seat 11 of the chair 10 and the base 13 of the chair 10 are connected to one another via the actuator assembly 320". The embodiment of FIG. 6 is shown in schematic fashion, but may have many of the features of the actuator assembly 20 of FIGS. 2 and 3, and of the actuator assembly 320 of FIGS. 6 and 6*a*, such as the U-shaped cross-sections, the duplication of components and/or the symmetrical plane. Likewise, the actuator may be of the same nature.

In the embodiment shown, the actuator assembly 320" includes a frame 321" and a carrier 322" pivotally connected to the frame 321" at a first pivot axis K1. Both the frame 321" and the carrier 322" may have U-shaped cross-sections at least at locations of the pivot axes K1 and K2. An actuator 323" is secured to the frame 321" (e.g., in a gap as in FIGS. 2 and 3). An assembly of linking members interconnect an end of the actuator 323" to the carrier 322". The assembly of linking members includes a first member 324", a link member 325", and a second member 326". In terms of duplication of components, there may be pairs of the members 324" and 326", for a single angled member 325", or pair of all members, 324", 325", 326", etc. The members 324", 325" and 326" may be described as links.

The first member 324" is pivotally connected at its first end to the end of the actuator 323" and pivotally connected at its second end to the link member 325". The link member 325" is pivotally connected to the frame 321" for rotation about the second pivot axis K2. The link member 325" is further pivotally connected to the second member 326" at a first end of the second member 326". The second end of the second member 326" is pivotally connected to the carrier 322". In contrast to the actuator assembly 320 of FIGS. 6 and 6a, the link member 325" and the second member 326" are located rearward of the pivot connection between the actuator 323" and the member 324", for compactness.

Extension of the actuator 323" pushes on the first member 324" that pushes on the link member 325", to rotate the link member 325" about the second pivot axis K2. The members 324", 325" rotate relative to one another when the link member 325" rotates about the second pivot axis K2. Rotation of the link member 325" causes the link member 325" to push against the straight member 326" to push on the carrier 322 at a location distanced from the first pivot axis K1 resulting in the carrier 322", and the seat 11, rotating about the first pivot axis K1 and tilting backward. The motion is reversed when the actuator 323" is contracted.

Figure 7:
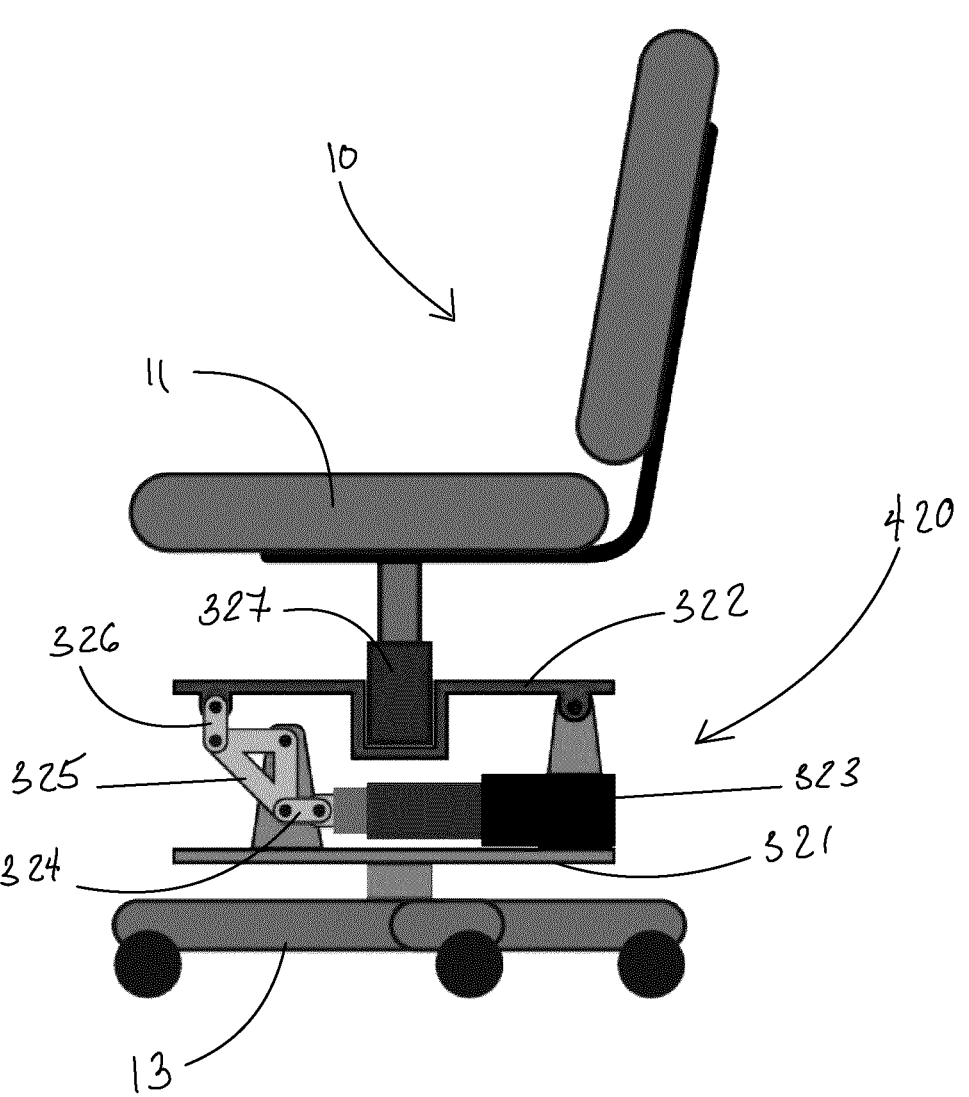
FIG. 7 is a schematic side view of a chair equipped with a motion simulator in accordance with another embodiment.

Referring now to FIG. 7, an alternate embodiment of an actuator assembly is shown at 420. The seat 11 of the chair 10 and the base 13 of the chair 10 are connected to one another via the actuator assembly 420.

The actuator assembly 420 includes the carrier, bottom plate, and linking members 324, 325, 326 and actuator 323 described above with reference to FIGS. 6 and 6a and further includes a second actuator 327. The second actuator 327 is oriented substantially vertically and is disposed between the seat 11 of the chair 10 and the carrier 322. The second actuator 327 is operable to vary a height of the seat 11 relative to the ground. The actuator assembly 420 therefore further allows additional variation in height. Alternatively, item 327 is a rotational joint. The second actuator 327 may be present in any of the embodiments described herein, and may be a low amplitude vibrational device. Alternatively, item 327 is a height-adjustment cylinder, for example a gas lift cylinder (commonly found in office chairs), used to set a height of the seat 11 relative to the ground. The height-adjustment cylinder may be present in any of the embodiments described herein.

Figure 8:
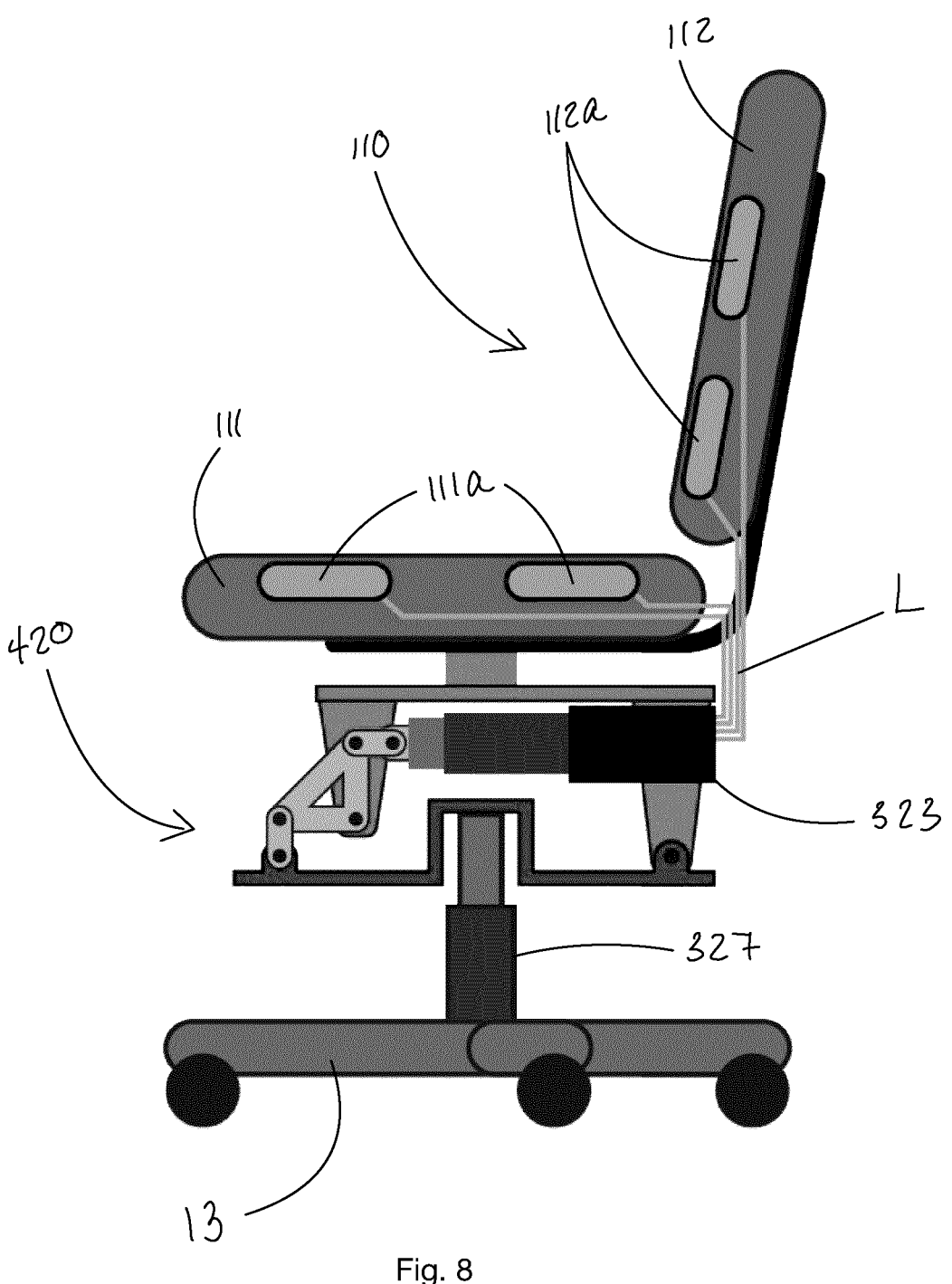
FIG. 8 is a schematic side view of a chair equipped with a motion simulator in accordance with another embodiment and with tactile pads.

Referring now to FIG. 8, an alternate embodiment of actuator assembly is shown at 420 equipped on a chair in accordance with another embodiment shown at 110. The seat 111 of the chair 110 and the base 13 of the chair 110 are connected to one another via the actuator assembly 420. The actuator assembly 420 corresponds to the one described herein above with reference to FIGS. 6 and 7, but disposed upside down. It could also be in the same orientation as in FIGS. 6 and 7.

In the embodiment shown, the seat 111 of the chair 110 includes at least one tactile pad 111a, two in the embodiment shown, embedded therein. The back rest 112 of the chair 110 includes at least one tactile pad 112a, two in the embodiment shown, embedded therein. The tactile pads 111a, 112a may be disposed in a matrix, for instance, 2 by 2. For the seat 111, two of the tactile pads 111a may register with the thigh of a user and two other tactile pads 111a may register with a buttock of the user. Similarly, two of the tactile pads 112a of the back rest 112 may register with opposite sides of a lower back region and two other of the tactile pads 112a of the back rest 112 may register with the shoulder blades of the user. The tactile pads 111a, 112a of the seat 111 and back rest 112 are connected via any suitable links L (e.g., wires, wireless) to the actuator 323 and may be connected to the second actuator 327 (or height-adjustment cylinder). The tactile pads 111a, 112a may be triggered to simulate movements of a video game. For instance, the tactile pads 111a, 112a may be triggered only on the left side to simulate a car turning in right. The tactile pads 111a, 112a may be low amplitude vibrating device, that may be used to simulate a vibration, that may be non encoded, in contrast the movements of the linear actuators of the various actuator assemblies described herein.

Figure 9:
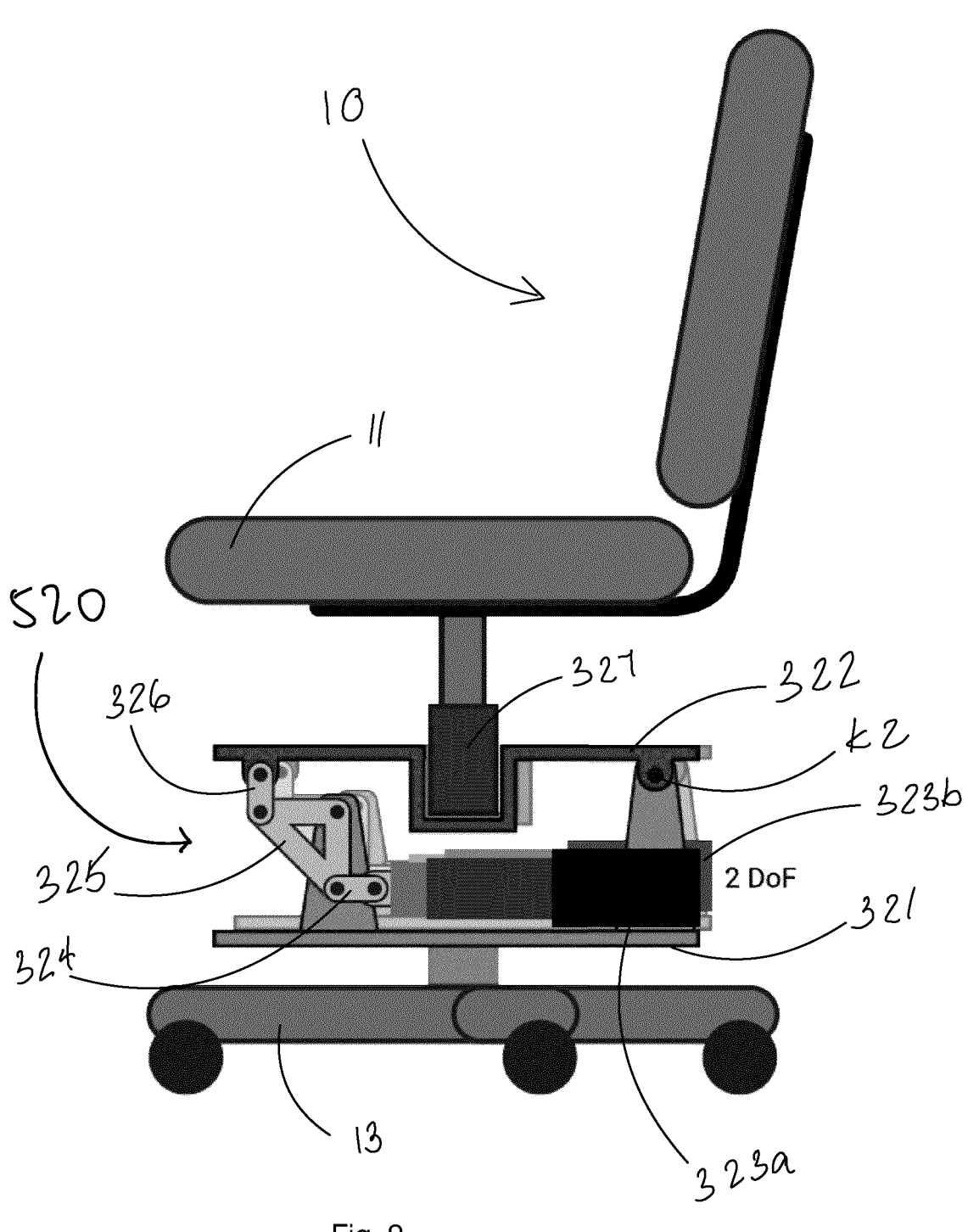
FIG. 9 is a schematic side view of a chair equipped with a motion simulator in accordance with yet another embodiment.

Referring now to FIG. 9, an alternate embodiment of an actuator assembly is shown at 520. The seat 11 of the chair 10 and the base 13 of the chair 10 are connected to one another via the actuator assembly 520.

The actuator assembly 520 is similar to the actuator assembly 420 described above with reference to FIGS. 6 and 7 and includes the frame, 321, the carrier 322 pivotally connected to the frame 321 at the first pivot axis K1. The actuator assembly 520 includes two actuators 323a, 323b disposed next to one another. Each of the two actuators 323a, 323b is operatively connected to the carrier 322 via respective three linking members 324, 325, 326 as explained above with reference to FIG. 6.

The actuator assembly 520 therefore offer two degrees of freedom in that it can allow to tilt the seat 11 of the chair 10 rearward and forward by operating the two actuators 323a, 323b symmetrically, but it can also tilt the seat 11 left or right by extending or contracting the two actuators 323a, 323b asymmetrically. For instance, if only a left one of the two actuators 323a is extended, the left side of the chair will tilt rearward giving a feeling of a turning vehicle to a user. To achieve such motion, joints between the linking members 324, 325, 326 may be spherical joints and/or may have the necessary degrees of freedom to allow such movements. For example, the joint between the member 326 and the carrier 322, and the joint at pivot axis K2 (a single joint being present) may be spherical joints. Stated differently, the actuator assembly 520 may have a tripod support arrangement, with two of the members 326 and a single spherical joint at K2.

Figure 10:
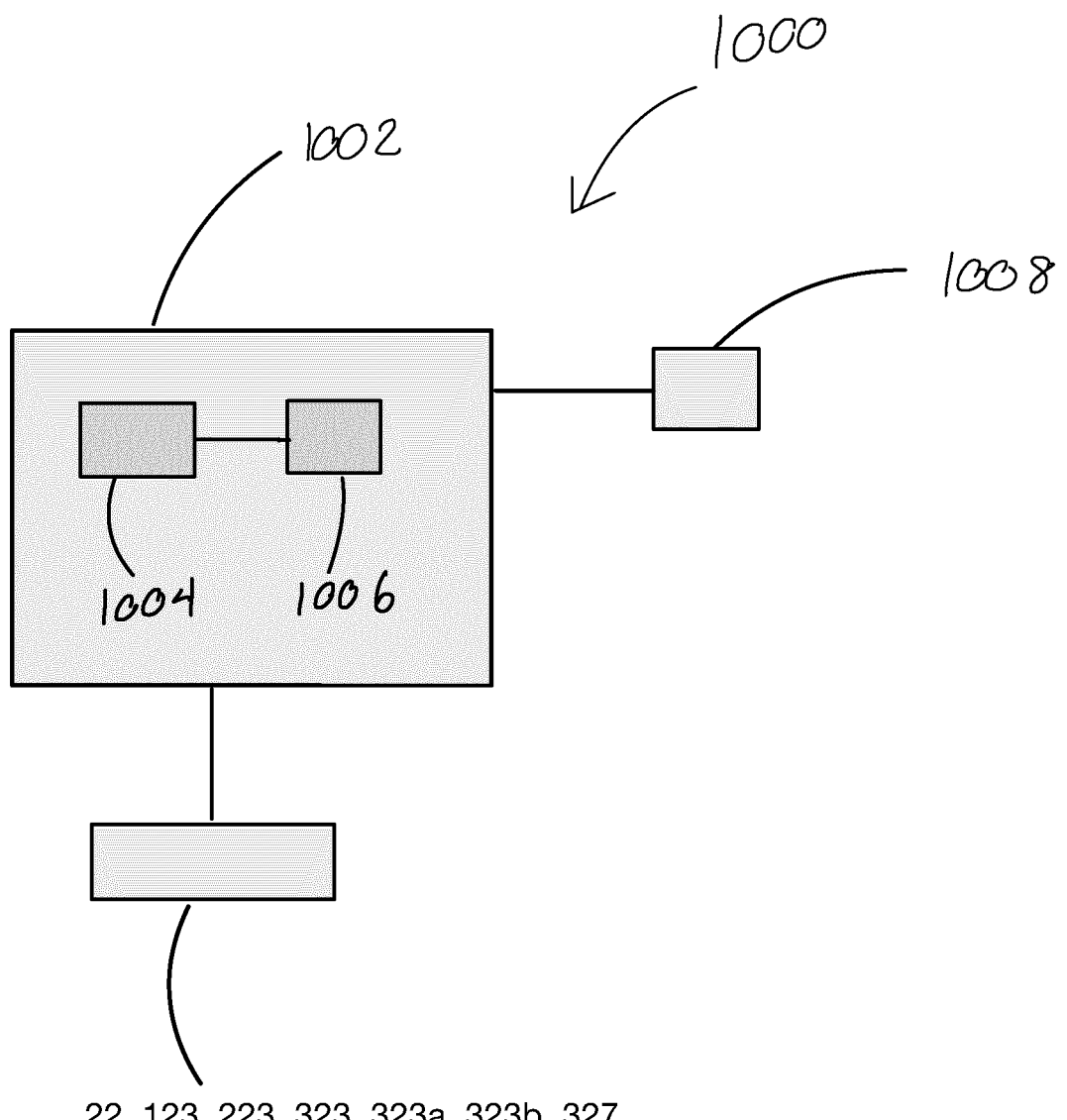
FIG. 10 is a schematic view of a control system that may be used with any of the motion simulators of FIGS. 1 to 9.

Referring to FIG. 10, a control system for the chairs 10, 110 is shown at 1000. The control system 1000 includes a controller 1002 having a processing unit 1004 operatively connected to a computer-readable medium having instructions stored thereon executable by the processing unit 1004 to receive data from a computer 1008. This computer 1008 may be a PC, a video game console, etc. The controller 1002 communicates with the actuators 22, 123, 223, 323, 323a, 323b, 327 and is able, based on the received data from the computer 1008, to determine adequate movements of the seat 11, 111 of the chair 10, 110 to enhance an experience of a user.

In all of the disclosed motion simulators 20, 120, 220, 320, 420, 520, the seat 11, 111 of the chair 10, 110 may be able to rotate relative to the base 13. In all of the disclosed motion simulators, the actuator 22, 123, 223, 323, 323*a*, 323*b* may be oriented substantially transverse to a vertical direction normal to the ground against which the chair 10, 110 rolls. The different linking members and cams are used to transfer a linear motion of the actuator that is substantially parallel to the ground in a vertical or tilting motion of the seat 11, 111 of the chair 110. Having the actuator transverse to the vertical direction allows to minimize a vertical space taken by the actuator to allow the actuator to be located between the base and the seat of the chair. The actuator may be used to adjust (e.g., electrically adjust) a height of the seat 11, 111 of the chair 10, 110 relative to the ground.

In all of the variants disclosed herein, a direction of movement of the linear actuator (e.g., 22, 123, 223, 323, 323*a*, 323*b*) lies in a transverse plane that is between 15 degrees and 165 degrees from a vertical frontal plane VFP of the motion simulator chair 10. This is shown in FIG. 6*a*, but applies to all motion simulator chairs described herein. The frontal plane is similar to that of the human anatomy, and is referred to as such in relation to the positioning of a human being in the chair, i.e., when seated with buttocks on the seat 11 and back against the backrest 12, the human has his/her/their frontal plane generally parallel (±20 degrees) to the vertical frontal plane (vertical frontal plane between perpendicular to the ground). The transverse plane may be described as similar to the human transverse plane, e.g., segmenting the limbs in upper and lower limb portions. During use, the orientation of the direction of movement of the linear actuator may vary, due to its pivot connection to the frame of the respectively actuator assembly. In a variant, the orientation of the direction of movement of the linear actuator in the transverse plane may vary by at most 30 degrees. For example, the orientation of the direction of movement of the linear actuator in the transverse plane may vary between 75 degrees and 105 degrees from a vertical frontal plane VFP of the motion simulator chair 10, during use. In an embodiment, the orientation of the direction of movement of the linear actuator, from an at-rest condition, without any occupant in the chair 10, or with an occupant in the chair 10 is between 65 degrees and 115 degrees in the transverse plane, inclusively, from a vertical frontal plane VFP. The movement of the seat 11 resulting from actuation may be said to be at least partially vertical when the chair 10 is on the ground, in any of the embodiments, i.e., there is a vertical component to the movement vector.

As can be seen therefore, the examples described above and illustrated are intended to be exemplary only. The scope is indicated by the appended claims.

What is claimed is:

1. A motion simulator chair, comprising:
a base configured to be on the ground;
at least a seat configured to receive a user having a frontal plane, the seat configured to receive the user when the base in on the ground and the seat is above the base; and
an actuator assembly between the base and the seat, the actuator assembly including
a frame connected to the base,
a carrier connected to the seat, the carrier being pivotally and directly connected to the frame about a rotational axis, a linear actuator operatively connected to the frame and to the carrier by a mechanism, the linear actuator pushing and pulling on the mechanism to cause a movement of the carrier relative to the frame, the movement being at least partially vertical,
wherein a direction of movement of the linear actuator lies in a transverse plane that is between 65 degrees and 115 degrees from a vertical frontal plane of the motion simulator chair, the vertical frontal plane being perpendicular to the ground when the base of the motion simulator chair is on the ground and the seat is above the base, the vertical frontal plane configured to be parallel ±20 degrees to the frontal plane of the user in the seat, the rotational axis being parallel to the vertical frontal plane.

2. The motion simulator chair according to claim 1, wherein the transverse plane is between 65 degrees and 115 degrees from the vertical frontal plane of the motion simulator chair at an at-rest condition of the seat.

3. The motion simulator chair according to claim 1, wherein the transverse plane moves by at most 30 degrees relative to the vertical frontal plane during use.

4. The motion simulator chair according to claim 1, wherein the frame is connected to the base by a post.

5. The motion simulator chair according to claim 4, wherein the carrier is connected to the seat by a post.

6. The motion simulator chair according to claim 5, wherein an axial projection of the post of the seat in a direction of the post of the base intersects the post of the base.

7. The motion simulator chair according to claim 5, wherein the post of the seat includes a height-adjustment cylinder.

8. The motion simulator chair according to claim 1, wherein the base has legs with casters.

9. The motion simulator chair according to claim 1, wherein the frame has a U-shaped cross-section.

10. The motion simulator chair according to claim 9, wherein the linear actuator is at least partially within the frame.

11. The motion simulator chair according to claim 9, wherein the linear actuator is pivotally connected to the frame.

12. The motion simulator chair according to claim 9, wherein the frame has an inverted U-shaped cross-section.

13. The motion simulator chair according to claim 1, wherein the mechanism includes a link member pivotally connected to the frame, and pushed or pulled by the linear actuator to impart a movement to the carrier.

14. The motion simulator chair according to claim 13, wherein the mechanism includes another link member pivotally connected to the linear actuator and to the link member.

15. The motion simulator chair according to claim 14, wherein the mechanism includes another link member pivotally connected to the carrier and to the link member.

16. The motion simulator chair according to claim 1, wherein the mechanism includes an adjustment lever assembly to adjust an at-rest orientation of the linear actuator.

17. The motion simulator chair according to claim 1, wherein the chair is a gaming chair.

18. The motion simulator chair according to claim 1, including a controller to drive the linear actuator.

19. The motion simulator chair according to claim 1, wherein the linear actuator is an electro-mechanical linear actuator.

20. A motion simulator chair, comprising:

a base configured to be on the ground;

at least a seat configured to receive a user having a frontal plane, the seat configured to receive the user when the base in on the ground and the seat is above the base; and an actuator assembly between the base and the seat, the actuator assembly including a frame connected to the base, a carrier connected to the seat, the carrier being pivotally and directly connected to the frame about a rotational axis, an electro-mechanical linear actuator operatively connected to the frame and to the carrier by a mechanism at a single output end of the linear actuator, the single output end of the linear actuator alone pushing and pulling on the mechanism to cause a movement of the carrier relative to the frame, the movement being at least partially vertical, wherein a direction of movement of the linear actuator lies in a transverse plane that is between 65 degrees and 115 degrees from a vertical frontal plane of the motion simulator chair, the vertical frontal plane being perpendicular to the ground when the base of the motion simulator chair in on the ground and the seat is above the base, the vertical front plane configured to be parallel ±20 degrees to the frontal plane of the user in the seat.

\* \* \* \* \*